United States Patent
Heronimus

(10) Patent No.: US 11,579,859 B2
(45) Date of Patent: Feb. 14, 2023

(54) DYNAMIC INVOCATION OF PARTNER PRODUCT EXIT ROUTINE IN AN ACTIVE INFORMATION MANAGEMENT SYSTEM

(71) Applicant: Imperva, Inc., San Mateo, CA (US)

(72) Inventor: Scott Heronimus, Austin, TX (US)

(73) Assignee: Imperva, Inc., San Mateo, CA (US)

( * ) Notice: Subject to any disclaimer, the term of this patent is extended or adjusted under 35 U.S.C. 154(b) by 0 days.

(21) Appl. No.: 17/137,348

(22) Filed: Dec. 29, 2020

(65) Prior Publication Data
US 2022/0206775 A1 Jun. 30, 2022

(51) Int. Cl.
G06F 9/44 (2018.01)
G06F 8/61 (2018.01)
G06F 9/48 (2006.01)

(52) U.S. Cl.
CPC .............. G06F 8/61 (2013.01); G06F 9/4812 (2013.01)

(58) Field of Classification Search
CPC ................................ G06F 8/61; G06F 9/4812
USPC .................................................. 717/168–178
See application file for complete search history.

(56) References Cited

U.S. PATENT DOCUMENTS

| | | | | |
|---|---|---|---|---|
| 5,768,500 A * | 6/1998 | Agrawal | ................ | G06F 11/348 717/130 |
| 6,110,228 A * | 8/2000 | Albright | ................. | G06F 8/658 709/217 |
| 6,530,078 B1 * | 3/2003 | Shmid | ................. | G06F 9/45537 718/1 |
| 7,574,521 B2 * | 8/2009 | D'Angelo | ........... | H04L 67/2823 709/236 |
| 7,693,790 B2 * | 4/2010 | Lawlor | .................. | G06Q 40/02 705/40 |

OTHER PUBLICATIONS

"Exit Routines," Oct. 27, 2020 edition, 806 pages, IMS Version 15, IBM.
Imperva, v14.2 Agent for zOS Installation and Configuration Guide, Dec. 2, 2020, 3 pages.
"Tools Base V1.6—Common Services—IMS Tools Generic Exits reference," 2 pages, downloaded from https://www.ibm.com/support/knowledgecenter/SSS8US_1.6.0/aiics/topics/alics_part-genexits.htm on Dec. 29, 2020.

* cited by examiner

*Primary Examiner* — Ted T. Vo
(74) *Attorney, Agent, or Firm* — Nicholson, De Vos, Webster & Elliott, LLP

(57) ABSTRACT

A method in a mainframe computing system to invoke a partner product exit routine in an information management system while the information management system is in operation. The method includes scheduling an interrupt routine for execution, creating, by the interrupt routine, an information management system task, where the information management system task is a work unit that provides a logical service within the information management system, scheduling, by the interrupt routine, the information management system task for execution, invoking, by the information management system task, the partner product exit routine, and installing, by the partner product exit routine, a component of a software product that allows the software product to integrate with the information management system.

20 Claims, 3 Drawing Sheets

DYNAMIC INVOCATION OF PARTNER PRODUCT EXIT ROUTINE IN AN ACTIVE INFORMATION MANAGEMENT SYSTEM

TECHNICAL FIELD

Embodiments of the invention relate to the field of information management systems, and more specifically to dynamically invoking a partner product exit routine in an active information management system.

BACKGROUND

International Business Machine Corporation (IBM) Information Management System (IMS) is an information management system that supports transaction processing. Many of today's business-critical activities such as credit card processing, automated teller machine services, package tracking and delivery, airline and hotel reservations, telephone & utility billing, and order entry and inventory control rely on IBM IMS or similar information management systems.

IBM IMS includes a partner product exit routine that provides vendors with a standard programming interface for integrating third-party software products with IBM IMS. The partner product exit routine is natively driven only once during initialization of IBM IMS. Also, the partner product exit routine (including any additional load modules) must be accessible via private library concatenation (e.g., via STEPLIB—a static list of libraries that IBM IMS loads during initialization).

A drawback of the existing approach to integrating third-party software products with IBM IMS is that it requires modifying the job control language (JCL) code in the IBM IMS control region (to specify the libraries needed to integrate the software product) and restarting IBM IMS to invoke the partner product exit, which results in an outage of IBM IMS for a non-trivial length of time, which in turn results in the interruption of business-critical activities that rely on IBM IMS.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
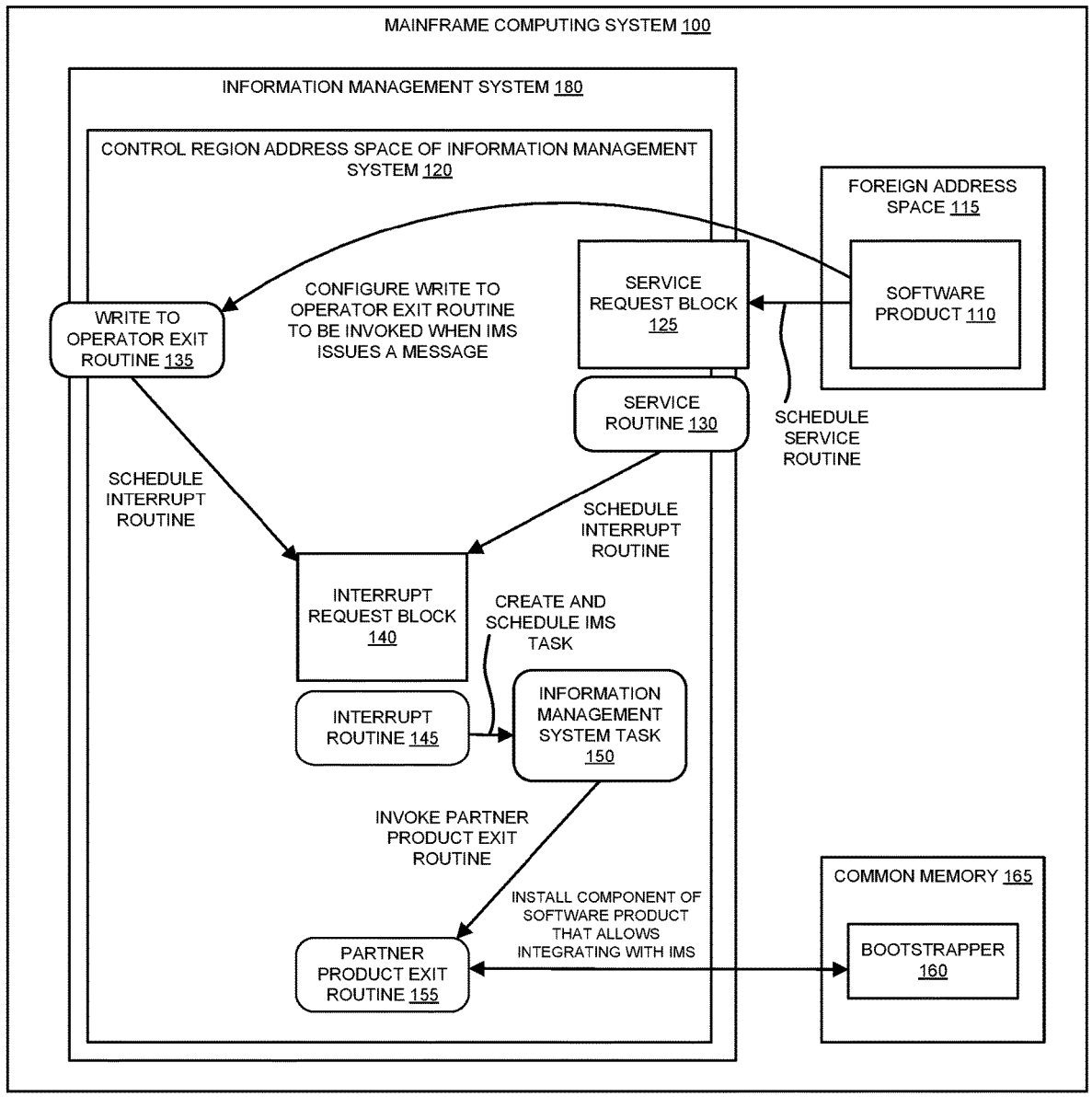
FIG. 1 is a block diagram of a mainframe computing system that dynamically invokes a partner product exit routine, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other As mentioned above, a drawback of the existing approach to integrating third-party software products with IBM IMS is that it requires modifying the job control language (JCL) code in the IBM IMS control region (to specify the libraries needed to integrate the software product) and restarting IBM IMS to invoke the partner product exit, which results in an outage of IBM IMS for a non-trivial length of time, which in turn results in the interruption of business-critical activities that rely on IBM IMS.

Embodiments are disclosed herein that allow for invoking a partner product exit routine in an information management system at an arbitrary time (after the information system is in operation and not just during initialization) without having to restart the information management system. Such approach to invoking a partner product exit routine may be referred to herein as "dynamically" invoking the partner product exit routine. Embodiments provide an advantage over the existing approach in that they allow software products to be integrated with the information management system without suffering an outage (e.g., because the partner product exit can be invoked without restarting the information management system) and thus without interrupting business-critical applications that rely on the information management system.

The term "information management system" is used herein to refer to any system (e.g., implemented by software executing on hardware) that provides digital information management functionality. IBM IMS mentioned above is one example of an information management system. While for purposes of illustration various examples will primarily be described in the context of an IBM IMS executing on top of an IBM z/OS mainframe operating system, it should be understood that the techniques described herein can be applied to other/similar contexts.

An embodiment is a method in a mainframe computing system to invoke a partner product exit routine in an information management system while the information management system is in operation. The method includes scheduling an interrupt routine for execution, creating, by the interrupt routine, an information management system task, where the information management system task is a work unit that provides a logical service within the information management system, scheduling, by the interrupt routine, the information management system task for execution, invoking, by the information management system task, the partner product exit routine, and installing, by the partner product exit routine, a component of a software product that allows the software product to integrate with the information management system. Embodiments are further described herein with reference to the accompanying figures.

FIG. 1 is a block diagram of a mainframe computing system that dynamically invokes a partner product exit routine, according to some embodiments. As shown in the diagram, the mainframe computing system 100 implements an information management system 180. The information management system 180 may run on top of a mainframe operating system. In one embodiment, the information management system 180 is IBM IMS that runs on top of an IBM z/OS mainframe operating system. In one embodiment, the information management system 180 implements a database manager (e.g., for a hierarchical database) and/or a transaction manager. The mainframe computing system 100 may be implemented using one or more electronic/computing devices.

The information management system 180 may include a control region address space 120. The control region address space 120 of the information management system 180 is an operating system address space that provides the central point of control for the information management system 180. The control region address space 120 of the information management system 180 may provide the interface to the operating system for the operation of the information management system 180.

As shown in the diagram, the mainframe computing system 100 implements a software product 110 executing in a foreign address space 115. The foreign address space 115 may be an address space of the operating system that is different/separate from the control region address space 120 of the information management system 180. The software product 110 may be a third-party software product (e.g., a software product developed/provided by an entity that is different from the entity that developed/provided the information management system 180) that is to integrate with the information management system 180. In one embodiment, the software product 110 is to provide database activity auditing functionality for the information management system. The software product 110 may have a need to integrate with the information management system 180, for example, to access the information managed by the information management system 180 and/or to augment the functionality of the information management system 180 (e.g., with enhanced database activity auditing functionality).

In one embodiment, the software product 110 integrates itself with the information management system 180 based on causing a partner product exit routine 155 of the information management system 180 to be invoked while the information management system 180 is in operation (e.g., without restarting the information management system 180). The information management system 180 may provide a partner product exit routine 155 to allow software products (e.g., software product 110) to integrate with the information management system 180 (e.g., DFSPPUE0 in IBM IMS). When invoked, the partner product exit routine 155 may install a component of the software product 110 that allows the software product 110 to integrate with the information management system (by creating a "hook" into the information management system 180). This dynamic approach to invoking a partner product exit routine 155 is in contrast to the existing approach which only allows for invoking the partner product exit routine 155 during initialization of the information management system, which disadvantageously requires modifying code in the control region address space 120 of the information management system 180 and restarting the information management system 180, which results in an outage of the information management system 180 for a non-trivial length of time, which in turn results in the interruption of business-critical activities that rely on the information management system 180. Dynamically invoking a partner product exit routine 155 allows a software product 110 to integrate with the information management system 180 without or with minimal interruption to business-critical activities that rely on the information management system 180.

The software product 110 may cause a partner product exit routine 155 to be invoked in more than one way. For example, as will be further described herein, the software product 110 may cause a partner product exit routine 155 to be invoked by scheduling a service routine 130 for execution and/or configuring a write to operator exit routine 135 to be invoked.

As mentioned above, the software product 110 may cause a partner product exit routine 155 to be invoked by scheduling a service routine 130 for execution. The software product 110 may schedule the service routine 130 for execution using a service request block 125. A service request block 125 is a control block that represents a routine that performs a particular function or service (the service routine 130) in a specified address space. The software product 110 may schedule the service routine 130 to execute in a control region address space 120 of the information management system 180. In one embodiment, the software product 110 schedules the service routine 130 using the "IEAMSCHD" macro.

The service routine 130 may then schedule an interrupt routine 145 for execution. An interrupt routine 145 is a routine that preempts (or "interrupts") an existing routine and may execute asynchronously. The service routine 130 may schedule the interrupt routine 145 for execution using an interrupt request block 140. An interrupt request block 140 is a control block that represents an interrupt routine. The service routine 130 may execute in the control region address space 120 of the information management system 180. In one embodiment, the service routine 130 schedules an interrupt routine 145 for execution using the "SCHEDIRB" macro.

The interrupt routine 145 may create and schedule an information management system task 150. An information management system task 150 is a work unit that provides a logical service within the information management system 180 (e.g., an "ITASK" in IBM IMS). In one embodiment, the interrupt routine 145 creates the ITASK 150 using the "DFSCIR" macro and schedules the ITASK using the "IPOST" macro.

The interrupt routine 145 may execute in the control region address space 120 of the information management system 180. It should be noted that the service routine 130 and the interrupt routine 145 may be scheduled at the operating system level as preliminary steps to be able to schedule the information management system task 150, which allows for performing operations at the information management system level (e.g., invoking a partner product exit routine 155).

The information management system task 150 may invoke the partner product exit routine 155. The information management system task 150 may receive the full array of internal memory management, serialization, and messaging services of the information management system 180. This makes the information management system task 150 transparent to the partner product exit routine 155 and indistinguishable from the native environment. That is, the partner product exit routine 155 may not be aware that it is being dynamically invoked via the interrupt routine 145 instead of being invoked during initialization of the information management system 180.

The partner product exit routine 155 may install a component of the software product 110 that allows the software product 110 to integrate with the information management system 180. In one embodiment, the partner product exit routine 155 installs the component of the software product 110 by loading a bootstrapper 160 from common memory 165 (memory that is accessible from any other address space) that initiates the installation process. In this way, the software product 110 may integrate itself with the information management system 180 by dynamically invoking a partner product exit routine 155.

Using a service routine 130 to invoke a partner product exit routine 155 may be particularly useful in situations where the information management system 180 is already in operation when the software product 110 wishes to integrate with the information management system 180. When the software product 110 wishes to integrate with the information management system 180 (e.g., when the software product 110 first enters into operation) it may search for the information management system 180 and schedule a service routine 130 when it discovers the information management system 180 to cause the partner product exit routine 155 in the information management system 180 to be dynamically invoked. However, if the information management system 180 enters into operation after the software product 110 is already in operation then the software product 110 may not be aware of the existence of the information management system 180 and thus not know to integrate with the information management system 180. In this situation, as will be further described herein, the software product 110 may use a write to operator exit routine 135 to invoke the partner product exit routine 155.

When the information management system 180 first enters into operation it may issue a message (e.g., to an operator console) indicating that it has entered into operation (e.g., a "DFS4878I" message that is issued during IBM IMS cold restart and IBM IMS restart to indicate the current IBM IMS version and function level). The software product 110 may configure a write to operator exit routine 135 to be invoked whenever the information management system issues such a message (or any other message indicating that the information management system 180 is in operation). The write to operator exit routine 135 may schedule an interrupt routine 145 for execution (e.g., using the interrupt request block 140), which creates and schedule an information management system task 150, which in turn invokes a partner product exit routine 155 that installs a component of the software product 110 that allows the software product 110 to integrate with the information management system 180, in a similar manner as described above.

Thus, the interrupt routine 145 may be scheduled using a service routine 130 and/or a write to operator exit routine 135. As mentioned above, scheduling the interrupt routine 145 using a service routine 130 may be particularly useful in situations where the information management system 180 is already in operation when the software product 110 wishes to integrate with the information management system 180 while scheduling the interrupt routine 145 using a write to operator exit routine 135 may be particularly useful in situations where the information management system 180 enters into operation after the software product 110 is already in operation.

Embodiment may provide one or more advantages over existing approaches to invoking a partner product exit routine 155. One advantage is that embodiments allow a partner product exit routine 155 to be invoked at an arbitrary time while the information management system 180 is in operation (not just during initialization of the information management system 180) without having to modify code (e.g., JCL code) in the control region address space 120 of the information management system 180 (e.g., because the software product 110 does not need to be stored in the control region address space 120 of the information management system 180 but may be stored outside of the control region address space 120 (e.g., in common memory 165)) and without having to restart the information management system 180. This allows software products 110 to be integrated with the information management system 180 without interrupting business-critical applications that rely on the information management system 180. The vendor/developer of a software product 110 may use the approach described herein or similar approach to integrate their software product 110 with a customer's or potential customer's information management system 180 (e.g., to provide a trial of the software product 110 to the potential customer). The customer or potential customer is much more likely to agree to integrate a vendor's software product 110 with their information management system 180 if it does not interrupt the operations of their information management system 180 (or minimizes interruptions thereof), thus providing a competitive advantage for the vendor over other vendors that require restarting the customer's information management system 180 to integrate their software products, which will result in an outage of the customer's information management system 180 for a non-trivial length of time. Other advantages will be apparent to one of ordinary skill in the art in view of this disclosure.

Figure 2:
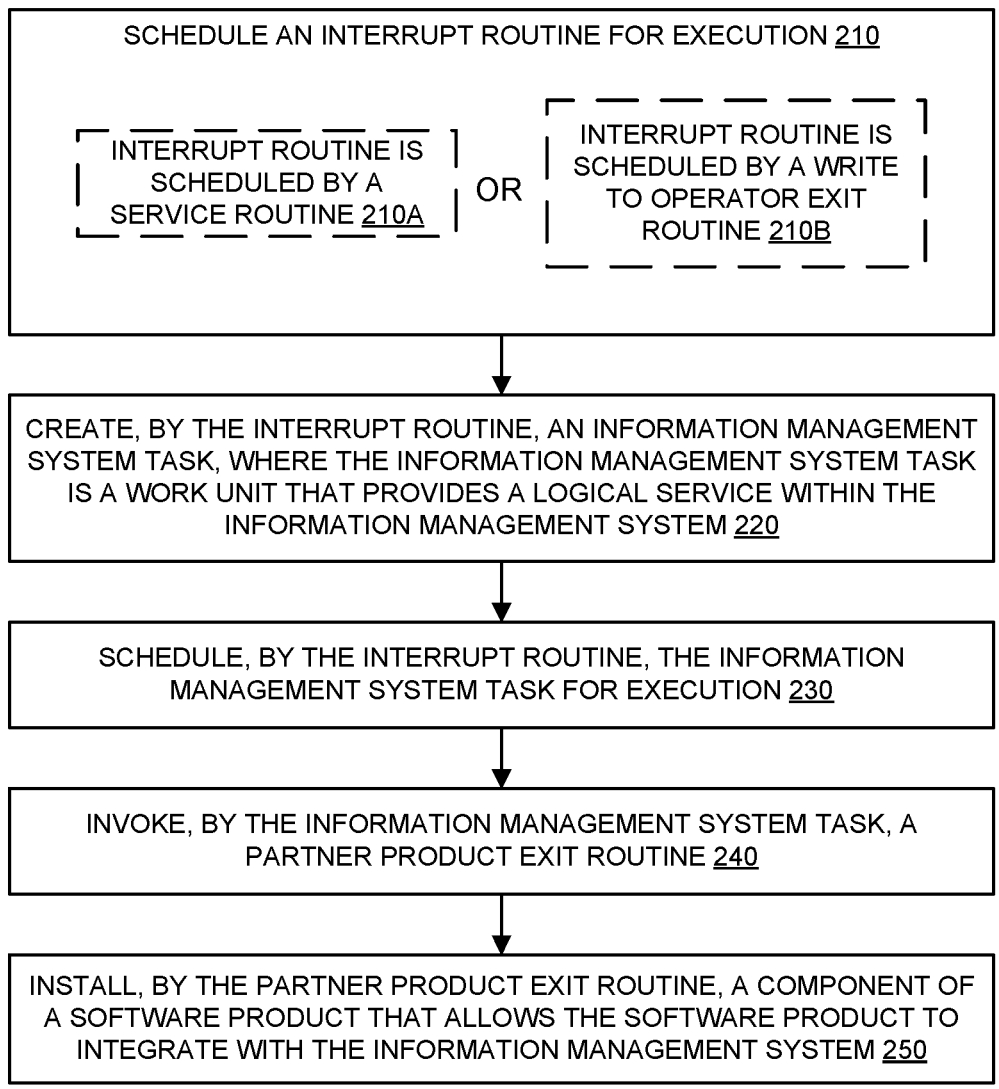
FIG. 2 is a flow diagram of a process for dynamically invoking a partner product exit routine, according to some embodiments.

FIG. 2 is a flow diagram of a process for dynamically invoking a partner product exit routine, according to some embodiments. In one embodiment, the process is implemented in a mainframe computing system 100. The process may be implemented using hardware, software, firmware, or any combination thereof.

The operations in the flow diagram are described with reference to the exemplary embodiments of the other diagrams. However, it should be understood that the operations of the flow diagram can be performed by embodiments other than those discussed with reference to these other diagrams, and the embodiments discussed with reference to these other diagrams can perform operations different than those discussed with reference to the flow diagram. Also, while the flow diagram shows a particular order of operations performed by certain embodiments, it should be understood that such order is exemplary (e.g., alternative embodiments may perform the operations in a different order, combine certain operations, overlap certain operations, etc.).

At block 210, an interrupt routine is scheduled for execution. In one embodiment, the interrupt routine is scheduled by a service routine (block 210A) or a write to operator exit routine (210B). In one embodiment, the service routine is scheduled by a software product (that is to be integrated with the information management system), where the software product executes in an address space that is different from a control region address space of the information management system. In one embodiment, the service routine is scheduled using a service request block. In one embodiment, the service routine is scheduled to execute in a control region address space of the information management system. In one embodiment, the write to operator exit routine is invoked due to a message being issued by the information management system. In one embodiment, the message is a message issued by the information management system indicates that the information management system has entered into operation. In one embodiment, the interrupt routine is scheduled using an interrupt request block.

At block 220, the interrupt routine creates an information management system task, where the information management system task is a work unit that provides a logical service within the information management system. In one embodiment, the interrupt routine executes in a control region address space of the information management system.

At block 230, the interrupt routine schedules the information management task for execution.

At block 240, the information management system task invokes a partner product exit routine.

At block 250, the partner product exit routine installs a component of a software product that allows the software product to integrate with the information management system. In one embodiment, the software product is to provide database activity auditing functionality for the information management system.

Figure 3:
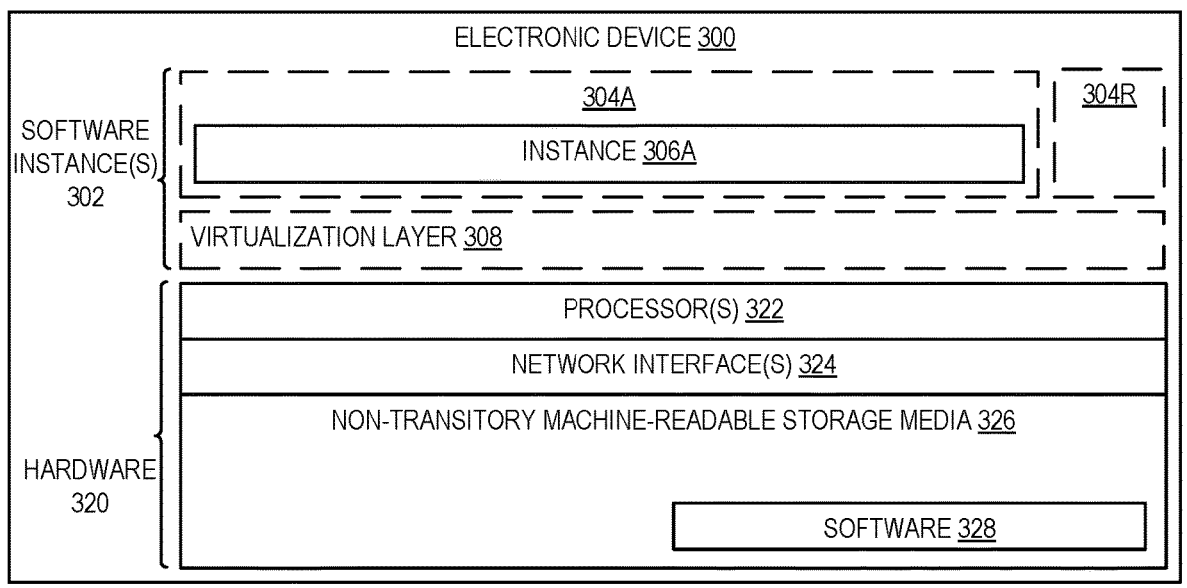
FIG. 3 is a block diagram illustrating an electronic device, according to some embodiments.

FIG. 3 is a block diagram illustrating an electronic device, according to some embodiments. FIG. 3 illustrates hardware 320 comprising a set of one or more processor(s) 322, a set of one or more network interfaces 323 (wireless and/or wired), and non-transitory machine-readable storage medium/media 326 having stored therein software 328 (which includes instructions executable by the set of one or more processor(s) 322). Software 328 can include code, which when executed by hardware 320, causes the electronic device 300 to perform operations of one or more embodiments described herein (e.g., operations for dynamically invoking a partner product exit routine).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a mainframe computing system to invoke a partner product exit routine in an information management system while the information management system is in operation, the method comprising:

scheduling an interrupt routine for execution;
creating, by the interrupt routine, an information management system task, wherein the information management system task is a work unit that provides a logical service within the information management system;
scheduling, by the interrupt routine, the information management system task for execution;
invoking, by the information management system task, the partner product exit routine after the information management system has been initialized and started up; and
installing, by the partner product exit routine, a component of a software product that allows the software product to integrate with the information management system.

2. The method of claim 1, wherein the software product is to provide database activity auditing functionality for the information management system.

3. The method of claim 1, further comprising:
scheduling a service routine for execution, wherein the service routine schedules the interrupt routine for execution.

4. The method of claim 3, wherein the service routine is scheduled using a service request block.

5. The method of claim 3, wherein the service routine is scheduled by the software product, wherein the software product executes in an address space that is different from a control region address space of the information management system.

6. The method of claim 5, wherein the service routine is scheduled to execute within a control region address space of the information management system.

7. The method of claim 1, wherein the interrupt routine is scheduled by a write to operator exit routine, wherein the write to operator exit routine is invoked due to a message being issued by the information management system.

8. The method of claim 7, wherein the message issued by the information management system indicates that the information management system has entered into operation.

9. The method of claim 1, wherein the interrupt routine is scheduled using an interrupt request block.

10. The method of claim 1, wherein the interrupt routine executes in a control region address space of the information management system, wherein the method further comprises:
loading, by the partner product exit routine, the component of the software product from a common memory that is outside of the control region address space of the information management system.

11. A set of one or more non-transitory machine-readable storage media storing instructions which, when executed by one or more processors of one or more computing devices implementing a mainframe computing system, causes the one or more computing devices to perform operations for invoking a partner product exit routine in an information management system while the information management system is in operation, the operations comprising:
scheduling an interrupt routine for execution;
creating, by the interrupt routine, an information management system task, wherein the information management system task is a work unit that provides a logical service within the information management system;
scheduling, by the interrupt routine, the information management system task for execution;
invoking, by the information management system task, the partner product exit routine after the information management system has been initialized and started up; and
installing, by the partner product exit routine, a component of a software product that allows the software product to integrate with the information management system.

12. The set of one or more non-transitory machine-readable storage media of claim 11, wherein the software product is to provide database activity auditing functionality for the information management system.

13. The set of one or more non-transitory machine-readable storage media of claim 11, wherein the operations further comprise:
scheduling a service routine for execution, wherein the service routine schedules the interrupt routine for execution.

14. The set of one or more non-transitory machine-readable storage media of claim 13, wherein the service routine is scheduled using a service request block.

15. The set of one or more non-transitory machine-readable storage media of claim 13, wherein the service routine is scheduled by the software product, wherein the software product executes in an address space that is different from a control region address space of the information management system.

16. The set of one or more non-transitory machine-readable storage media of claim 15, wherein the service routine is scheduled to execute within a control region address space of the information management system.

17. The set of one or more non-transitory machine-readable storage media of claim 11, wherein the interrupt routine is scheduled by a write to operator exit routine, wherein the write to operator exit routine is invoked due to a message being issued by the information management system.

18. The set of one or more non-transitory machine-readable storage media of claim 17, wherein the message issued by the information management system indicates that the information management system has entered into operation.

19. The set of one or more non-transitory machine-readable storage media of claim 11, wherein the interrupt routine is scheduled using an interrupt request block.

20. The set of one or more non-transitory machine-readable storage media of claim 11, wherein the interrupt routine executes in a control region address space of the information management system, wherein the operations further comprise: loading, by the partner product exit routine, the component of the software product from a common memory that is outside of the control region address space of the information management system.

\* \* \* \* \*